(12) United States Patent
Fermin

(10) Patent No.: US 11,335,053 B2
(45) Date of Patent: May 17, 2022

(54) TECHNOLOGIES FOR DIGITALLY RENDERING ITEMS HAVING DIGITAL DESIGNS

(71) Applicant: CIMPRESS SCHWEIZ GMBH, Winterthur (CH)

(72) Inventor: Jorel Fermin, Westwood, MA (US)

(73) Assignee: CIMPRESS SCHWEIZ GMBH, Winterthur (CH)

( * ) Notice: Subject to any disclaimer, the term of this patent is extended or adjusted under 35 U.S.C. 154(b) by 0 days.

(21) Appl. No.: 17/244,861

(22) Filed: Apr. 29, 2021

(65) Prior Publication Data

US 2021/0343067 A1 Nov. 4, 2021

Related U.S. Application Data

(60) Provisional application No. 63/017,282, filed on Apr. 29, 2020.

(51) Int. Cl.
*G06T 15/00* (2011.01)
*G06T 15/04* (2011.01)
(Continued)

(52) U.S. Cl.
CPC .......... *G06T 15/04* (2013.01); *G06F 3/04815* (2013.01); *G06F 3/04842* (2013.01); *G06F 3/04845* (2013.01); *G06T 9/001* (2013.01); *G06T 17/00* (2013.01); *G06T 19/20* (2013.01); *G06T 2219/2021* (2013.01)

(58) Field of Classification Search
None
See application file for complete search history.

(56) References Cited

U.S. PATENT DOCUMENTS 6,993,192 B1 * 1/2006 Silver ................ G06V 10/7515
382/199
7,133,052 B1 * 11/2006 Silva ..................... G06T 3/0093
345/646

(Continued)

FOREIGN PATENT DOCUMENTS

WO WO-2018/151612 A1 8/2018

OTHER PUBLICATIONS

Sykora et al., TexToons: Practical Texture Mapping for Hand-drawn Cartoon Animations, 2011, Proceedings of the ACM SIGGRAPH/Eurographics Symposium on Non-Photorealistic Animation and Rendering, pp. 75-84 (Year: 2011).*

(Continued)

*Primary Examiner* — Anh-Tuan V Nguyen
(74) *Attorney, Agent, or Firm* — Marshall, Gerstein & Borun LLP

(57) ABSTRACT

Systems and methods for digital rendering items with designs incorporate therein are disclosed. According to certain aspects, an electronic device may support a design application that may modify a digital image using an identity texture and a texture map, resulting in the modified digital image taking the shape or form of a portion of a digital model of an item. The electronic device may generate a digital rendering of the item using the modified digital image and the digital model of the item, and may enable a user to review the digital rendering and/or place an order for a physical version of the item according to the digital rendering.

20 Claims, 11 Drawing Sheets

(51) Int. Cl.
*G06F 3/04815* (2022.01)
*G06F 3/04842* (2022.01)
*G06F 3/04845* (2022.01)
*G06T 9/00* (2006.01)
*G06T 17/00* (2006.01)
*G06T 19/20* (2011.01)

(56) References Cited

U.S. PATENT DOCUMENTS

| | | | |
|---|---|---|---|
| 7,643,702 B1* | 1/2010 | Brandt | G06V 10/255 |
| | | | 382/289 |
| 8,174,539 B1 | 5/2012 | Samaniego et al. | |
| 2005/0104889 A1* | 5/2005 | Clemie | A63F 13/327 |
| | | | 345/522 |
| 2009/0153577 A1 | 6/2009 | Ghyme et al. | |
| 2011/0095978 A1* | 4/2011 | Pehlivan | G08C 17/00 |
| | | | 345/158 |
| 2013/0321443 A1* | 12/2013 | Pahwa | G06T 15/04 |
| | | | 345/587 |
| 2017/0053431 A1 | 2/2017 | Grenfell | |
| 2019/0012842 A1* | 1/2019 | Chaudhary | G06F 3/04845 |
| 2019/0035149 A1 | 1/2019 | Chen et al. | |

OTHER PUBLICATIONS

International Application No. PCT/IB2021/053584, International Search Report and Written Opinion, dated Jul. 23, 2021.

* cited by examiner

TECHNOLOGIES FOR DIGITALLY RENDERING ITEMS HAVING DIGITAL DESIGNS

CROSS-REFERENCE TO RELATED APPLICATIONS

This application claims priority to U.S. Patent Application No. 63/017,282, filed Apr. 29, 2020, the disclosure of which is hereby incorporated by reference in its entirety.

FIELD

The present disclosure is directed to improvements related to creating and editing digital designs. More particularly, the present disclosure is directed to platforms and technologies for rendering digital designs of items using digital images modified according to digital models.

BACKGROUND

Various printing and design services (e.g., via websites) that enable users to design products are well known and widely used by many consumers, professionals, and businesses. Personalized products may include both printed paper products and customized promotional products including, for instance, various articles of clothing such as t-shirts. The services may enable users to review images (e.g., thumbnail images) of various customizable design templates prepared by the site operator and having a variety of different styles, formats, backgrounds, color schemes, fonts, and graphics from which the users may choose. When a user has selected a specific product design template to customize, the services may enable the user to design a custom design through, for example, incorporating personal information and/or content. When the design is complete, the user may order one or more physical products according to the design for production and delivery.

It is advantageous for services to have the displayed image of a product be an accurate representation of the physical product that will be produced. However, it is difficult to accurately simulate or display, on a user's display, both the substrate (i.e., the physical product) and certain visual effects, such as areas of different or non-standard texture that are especially distinguishable from the main printed surface at different angles of lighting. Further, some types of textured finishes that elicit differing lighting effects to be applied in the creation of a finished product, including foil, gloss, raised print, embossment, vinyl, leather, cloth, and other textured finishes, may change in appearance depending on how light reflects off the finish textured surface.

Therefore, there is an opportunity for systems and methods to accurately and effectively render items on an electronic display of a user, including accurately and effectively rendering three-dimensional objects, especially in situations in which a digital design is incorporated into the rendered items.

SUMMARY

In an embodiment, a computer-implemented method of digitally rendering items is provided. The computer-implemented method may include: accessing, by a processor, a digital image and an identity texture; generating, by the processor, a texture map by modifying the identity texture based at least in part on a digital model of an item; encoding, by the processor, visual content of the digital image by applying the texture map to the digital image; modifying, by the processor, the digital image using the visual content that was encoded; generating, by the processor, a digital rendering of the item based on (i) the digital image that was modified, and (ii) the digital model of the item; and displaying, in a user interface, the digital rendering of the item.

According to another embodiment, a system for digitally rendering items is provided. The system may include: a user interface, a memory storing a set of computer-readable instructions, and a processor interfacing with the user interface and the memory. The processor may be configured to execute the set of computer-readable instructions to cause the processor to: access a digital image and an identity texture, generate a texture map by modifying the identity texture based at least in part on a digital model of an item, encode visual content of the digital image by applying the texture map to the digital image, modify the digital image using the visual content that was encoded, generate a digital rendering of the item based on (i) the digital image that was modified, and (ii) the digital model of the item, and cause the user interface to display the digital rendering of the item.

Further, in an embodiment, a non-transitory computer-readable storage medium is provided. The non-transitory computer-readable storage medium has stored thereon a set of instructions, where the set of instructions may comprise: instructions for accessing a digital image and an identity texture; instructions for generating a texture map by modifying the identity texture based at least in part on a digital model of an item; instructions for encoding visual content of the digital image by applying the texture map to the digital image; instructions for modifying the digital image using the visual content that was encoded; instructions for generating a digital rendering of the item based on (i) the digital image that was modified, and (ii) the digital model of the item; and instructions for displaying, in a user interface, the digital rendering of the item.

DETAILED DESCRIPTION

Figure 1A:
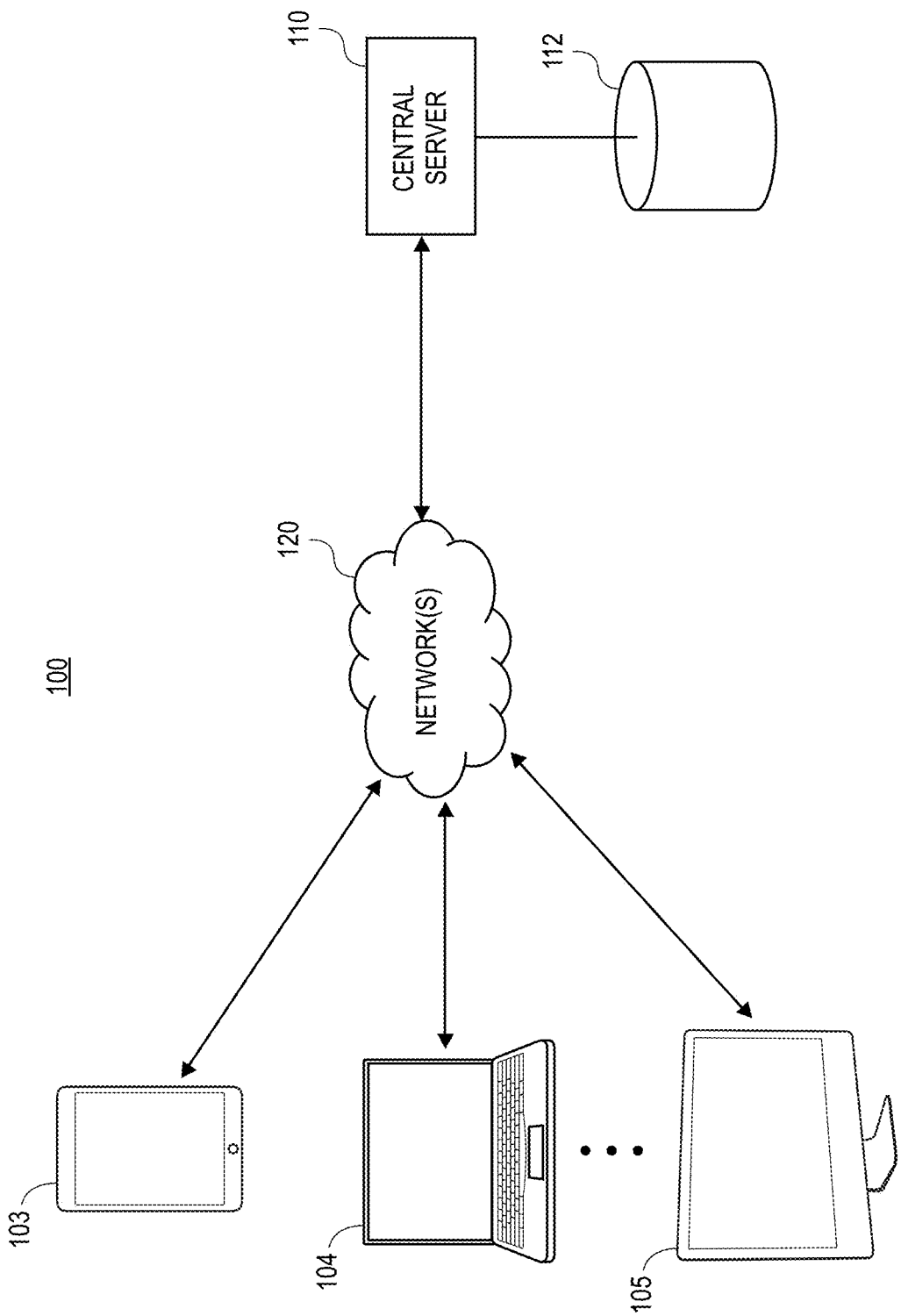
FIG. 1A depicts an overview of components and entities associated with the systems and methods, in accordance with some embodiments.

The present embodiments may relate to, inter alia, platforms and technologies for rendering digital designs. According to certain aspects, the systems and methods may support creating accurate representations of items having digital designs incorporated therein. Generally, a user may use a design platform to select an item and a digital design, and the systems and methods may analyze and process the digital design based on the selected item, and render the item with the digital design incorporated therein.

The systems and method may be used to simultaneously display a gallery of a set of items having a variety of different designs. For instance, a user interface may display a variety of face masks, each with a different design and each being based on the same item model (e.g., a 3D model). Additionally, users may want to view designs in context or scene, where a scene may be as simple as the product displayed against a blank background, or may be a complex scene that features the item.

Some scenes may not be easily describable in an accurate manner, such as scenes with simple deformations of pixels (e.g., tube warp, perspective warp, etc.), as in the case of items with complex geometries (e.g., a customized article of clothing which has complex contours both on and off of a person). For such scenes, the systems and methods may extract the deformations that the geometry imposes on the customer design.

To analyze and process the digital design for an item, the systems and methods may access a digital image and an identity texture, and generate a texture map by modifying the identity texture based at least in part on a digital model of the item. The systems and methods may modify the digital image using the texture map, and generate a digital rendering of the item using the modified digital image and the digital model of the item. An electronic device may display the digital rendering and enable a user to further modify aspects of the design as well as place an order for the physical item.

The systems and methods offer numerous benefits. In particular, the systems and methods support the accurate rendering of items with digital designs applied thereto. This is particularly beneficial when the items are 3D or otherwise have curves, multiple surfaces or components, and/or the like (e.g., face masks). Thus, a user reviewing the renderings is afforded an accurate depiction of the item, such as in contemplation of further modifying the design and/or placing an order for the physical item. An entity or service that supports the systems and methods may be afforded improved user experience and increased sales. It should be appreciated that additional benefits are envisioned.

The systems and methods discussed herein improve the functioning of a computer as well as improve virtual design platforms. Conventionally, designs applied to rendered items appear inaccurate, especially in situations in which the items have curved or irregular surfaces. The systems and methods are an improvement to virtual design platforms because the systems and methods employ various modeling elements to accurately map digital designs to selected surfaces or portions of given items, resulting in an accurate rendering of the product.

FIG. 1A illustrates an overview of a system 100 of components configured to facilitate the systems and methods. It should be appreciated that the system 100 is merely an example and that alternative or additional components are envisioned.

As illustrated in FIG. 1A, the system 100 may include a set of electronic devices 103, 104, 105 which may be used or operated by a set of users, such as any individual or person who may be interested in purchasing items, objects, products, and/or services that may be offered for sale by an entity. In an embodiment, the entity may be a corporation, company, partnership, retailer, wholesaler operating on behalf of another entity (e.g., a white label wholesaler), or the like, where the entity may offer an e-commerce platform (e.g., a website accessible by or an application executable by the electronic devices 103, 104 105) and optionally a set of brick-and-mortal retail stores. Each of the electronic devices 103, 104, 105 may be any type of electronic device such as a mobile device (e.g., a smartphone), desktop computer, notebook computer, tablet, phablet, GPS (Global Positioning System) or GPS-enabled device, smart watch, smart glasses, smart bracelet, wearable electronic, PDA (personal digital assistant), pager, computing device configured for wireless communication, and/or the like.

The electronic devices 103, 104, 105 may communicate with a central server 110 via one or more networks 120. The central server 110 may be associated with the entity that owns and/or manages the e-commerce platform(s) and/or the set of brick-and-mortal retail stores. In particular, the central server 110 may include or support a web server configured to host a website that offers various items/products and/or services for purchase by users. Further, the central server 110 may support a software application executable by the set of electronic devices 103, 104, 105 (i.e., the set of electronic devices 103, 104, 105 may interface with the central server 110 in executing the software application). In embodiments, the network(s) 120 may support any type of data communication via any standard or technology (e.g., GSM, CDMA, TDMA, WCDMA, LTE, EDGE, OFDM, GPRS, EV-DO, UWB, Internet, IEEE 802 including Ethernet, WiMAX, Wi-Fi, Bluetooth, and others).

Although depicted as a single central server 110 in FIG. 1A, it should be appreciated that the server 110 may be in the form of a distributed cluster of computers, servers, machines, or the like. In this implementation, the entity may utilize the distributed server(s) 110 as part of an on-demand cloud computing platform. Accordingly, when the electronic devices 103, 104, 105 interface with the server 110, the electronic devices 103, 104, 105 may actually interface with one or more of a number of distributed computers, servers, machines, or the like, to facilitate the described functionalities.

The central server 110 may be configured to interface with or support a memory or storage 112 capable of storing various data, such as in one or more databases or other forms of storage. According to embodiments, the storage 112 may store data or information associated with items or services that are offered for sale by the entity that owns and/or manages the e-commerce platform and/or the set of brick-and-mortal retail stores. For example, the storage 112 may store information associated with office supplies such as business cards and notepads, wellness items such as face masks, and/or the like, including information associated with a customer or client (e.g., company name and logo). For further example, the storage 112 may store templates of designs, as well as information associated with the designs, including properties and dimensions of the elements/components of the designs.

Although three (3) electronic devices 103, 104, 105, and one (1) server 110 are depicted in FIG. 1A, it should be appreciated that greater or fewer amounts are envisioned. For example, there may be multiple central servers, each one associated with a different entity. Additionally, the electronic devices 103, 104, 105 and the central server 110 may interface with one or more separate, third-party servers or data sources (not depicted in FIG. 1A) to retrieve relevant data and information.

Figure 1B:
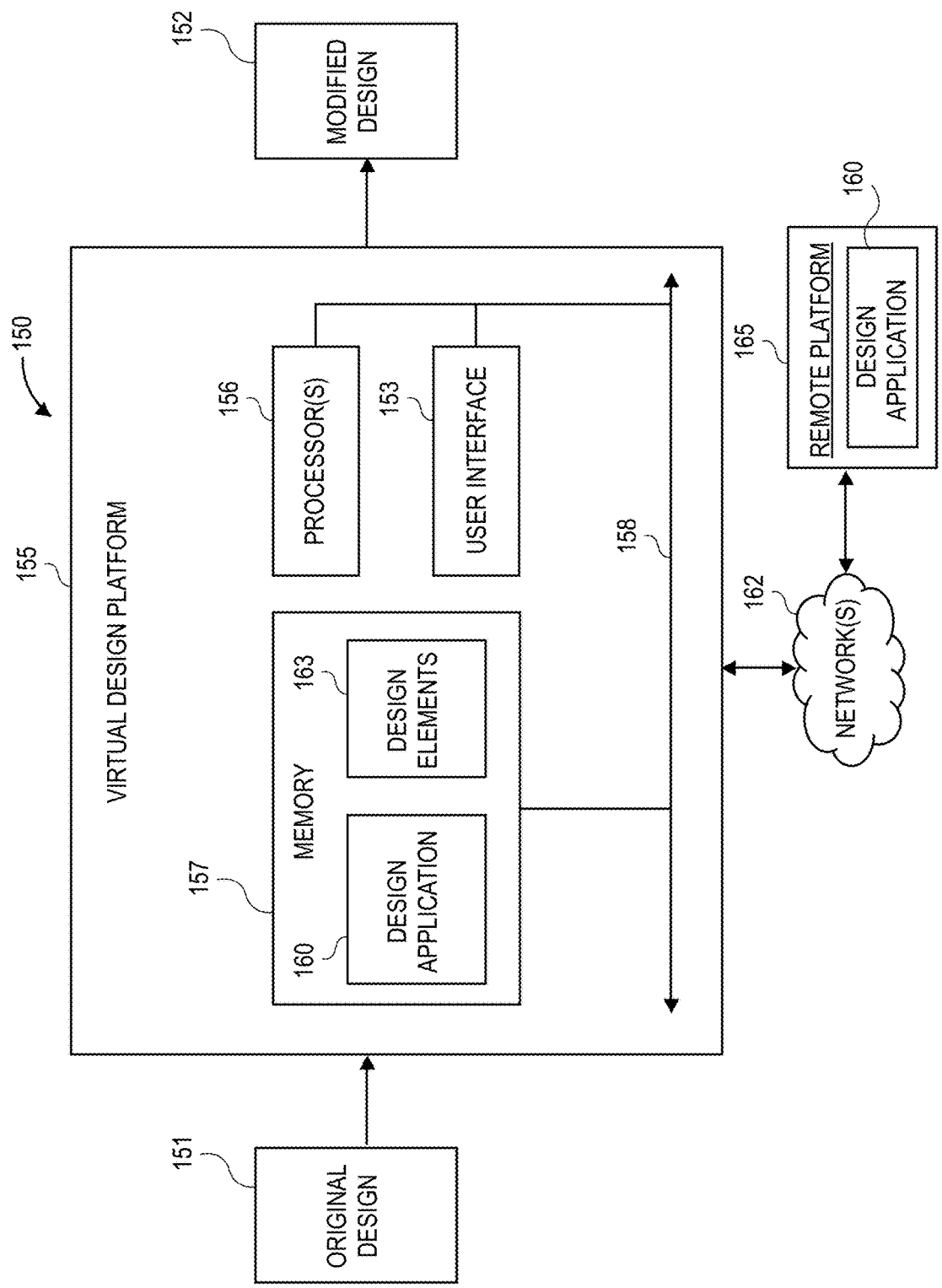
FIG. 1B depicts an overview of certain components configured to facilitate the systems and methods, in accordance with some embodiments.

According to embodiments, users of the electronic devices 103, 104, 105 may select an item (e.g., a blank item such as a face mask) as well as a desired designs for the item to preview and modify using the electronic devices 103, 104, 105, such as in contemplation of placing an order for the item with the design incorporated therein. The design may be in the form of at least one digital image in various file formats (e.g., JPEG, TIFF, GIF, PNG, Raw, etc.), where the digital image(s) may depict visual content (i.e., the design itself) that may be composed of one or more design elements (e.g., textual content, logos, colors, etc.). The electronic devices 103, 104, 105 may facilitate or perform various image processing techniques on the desired design to render the selected item with the desired design incorporated therein, for review by the users via a user interface(s) of the electronic devices 103, 104, 105. The electronic devices 103, 104, 105 may enable the users to place an order for the selected item with the desired design applied thereto. FIG. 1B depicts more specific components associated with the systems and methods.

FIG. 1B an example environment 150 in which an original design 151 is processed into a modified design 152 via a virtual design platform 155, according to embodiments. The virtual design platform 155 may be implemented on any computing device, including one or more of the electronic devices 103, 104, 105 or the server 110 as discussed with respect to FIG. 1A. Components of the computing device may include, but are not limited to, a processing unit (e.g., processor(s) 156), a system memory (e.g., memory 157), and a system bus 158 that couples various system components including the memory 157 to the processor(s) 156. In some embodiments, the processor(s) 156 may include one or more parallel processing units capable of processing data in parallel with one another. The system bus 158 may be any of several types of bus structures including a memory bus or memory controller, a peripheral bus, or a local bus, and may use any suitable bus architecture. By way of example, and not limitation, such architectures include the Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

The virtual design platform 155 may further include a user interface 153 configured to present content (e.g., designs and components/elements thereof). Additionally, a user may make selections to the content via the user interface 153, such as to modify designs (or design elements thereof) presented thereon. The user interface 153 may be embodied as part of a touchscreen configured to sense touch interactions and gestures by the user. Although not shown, other system components communicatively coupled to the system bus 158 may include input devices such as cursor control device (e.g., a mouse, trackball, touch pad, etc.) and keyboard (not shown). A monitor or other type of display device may also be connected to the system bus 158 via an interface, such as a video interface. In addition to the monitor, computers may also include other peripheral output devices such as a printer, which may be connected through an output peripheral interface (not shown).

The memory 157 may include a variety of computer-readable media. Computer-readable media may be any available media that can be accessed by the computing device and may include both volatile and nonvolatile media, and both removable and non-removable media. By way of non-limiting example, computer-readable media may comprise computer storage media, which may include volatile and nonvolatile, removable and non-removable media implemented in any method or technology for storage of information such as computer-readable instructions, routines, applications (e.g., a design application 160) data structures, program modules or other data. Computer storage media may include, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the processor 156 of the computing device.

The virtual design platform 155 may operate in a networked environment and communicate with one or more remote platforms, such as a remote platform 165, via a network 162, such as a local area network (LAN), a wide area network (WAN), or other suitable network. The platform 165 may be implemented on any computing device, including one or more of the electronic devices 103, 104, 105 or the server 110 as discussed with respect to FIG. 1A, and may include many or all of the elements described above with respect to the platform 155. In some embodiments, as will be described herein, the design application 160 as will be further described herein may be stored and executed by the remote platform 165 instead of by or in addition to the platform 155.

According to embodiments, the virtual design platform 155 (and more particularly, the design application 160) may process or modify the original design 151 to produce the modified design 152. Each of the original design 151 and the modified design 152 may be embodied as any type of singular or multiple electronic document, file, template, etc., that may include a set of design elements or components, each of which may be some type of displayable content (e.g., a combination of textual and/or visual content).

The original design 151 may be any type of template, user-created design, or the like, that may include a set of design elements, where the original design 151 may include at least one digital image in various file formats (e.g., JPEG, TIFF, GIF, PNG, Raw, etc.). The memory 157 may further store design elements 163 accessible to the design application 160, where the design elements 163 may correspond to digital models of items and components thereof. The virtual design platform 155 may enable a user to select a digital model (e.g., a 3D model) of an item. The virtual design platform 115 may perform various analysis and modifications of the original design 115 in association with the digital model of the item, and may output the modified design 152, where the modified design 152 may be a digital rendering of the item with the design associated with the original design 151 incorporated therein. These functionalities are further described with respect to FIG. 2.

Figure 2:
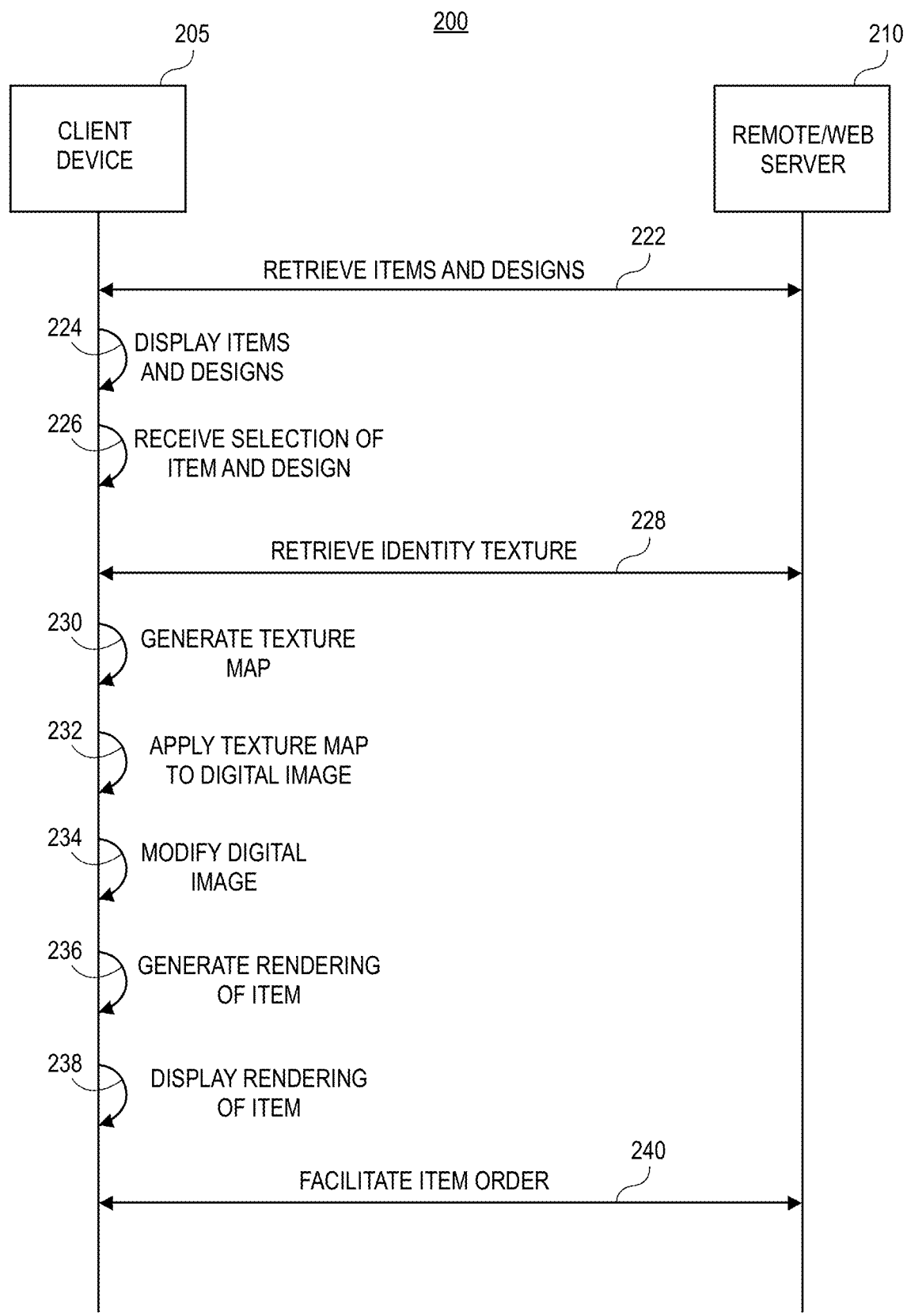
FIG. 2 depicts a signal diagram associated with rendering an item with a digital design applied thereto, in accordance with some embodiments.

FIG. 2 depicts a signal diagram 200 associated with digitally rendering items. The signal diagram 200 includes a client device 205 (such as one of the electronic devices 103, 104, 105 as discussed with respect to FIG. 1A), and a remote/web server 210 (such as the central server 110 as discussed with respect to FIG. 1A). According to embodiments, the server 210 may support a website (e.g., a digital design website and/or product design website), platform, or application that is accessible by the client device 205 via a network connection, where a user of the client device 205 may use the client device 205 to make selections associated with the website, platform, or application. It should be appreciated that the server 210 may interface with a data source(s) (not shown in FIG. 2) that may be any multimedia database configured to store various digital images, videos, textual content, and/or other content.

The signal diagram 200 may begin when the client device 205 retrieves (222) a set of items and a set of designs from the server 210. According to embodiments, the set of items may correspond to any item that a user of the client device 205 wishes to design and/or order. A given design of the set of designs may be embodied as a digital image in various file formats (e.g., JPEG, TIFF, GIF, PNG, Raw, etc.). A given item of the sets of items may be represented by a digital rendering, which may be in the form of one or more digital images in various file formats (e.g., JPEG, TIFF, GIF, PNG, Raw, etc.) or a digital model in various file formats (e.g., MAX, OBJ, FBX, 3DS, C4D, etc.). For example, a face mask may be represented by a 3D model illustrating various components of the face mask, such as a covering or mask portion and a set of ear straps. As used herein, a digital rendering of a given item may be referred to as a digital model.

Further, the set of designs may be user-created digital designs or templates. Generally, a given design may be applied to or incorporated on an item. For example, a face mask may have a design of a skyline for a city. In an implementation, the client device 205 may locally access at least a portion of the set of items and at least a portion of the set of designs.

The client device 205 may display (224), in a user interface, any of the set of items and the set of designs. The client device 205 may enable the user to browse the displayed items and designs. Additionally, the client device 205 may receive (226), via the user interface, a selection(s) of an item as well as a design for the selected item. For example, the user may select a face mask and a design of a skyline for a city as the design for the face mask. According to embodiments, the selected design as displayed may not initially conform to the selected item. In some implementations, a given item may already have a default design (i.e., the user may not need to select a certain design for a given item).

The client device 205 may retrieve (228) an identity texture from the server 210. In an implementation, the client device 205 may locally access the identity texture. According to embodiments, the identity texture may represent the design selected in (226) using universal coordinates (i.e., (0,0) to (1,1)). The identity texture may have the same aspect ratio as that of the selected design. In some scenarios, the identity texture may have a different aspect ratio than that of the selected design, such as to provide additional detail in a certain axis(es).

Generally, the identity texture may serve as an untransformed "map," and may serve as a basis for mapping from universal coordinate space to pixel space. Similar to how a conventional identity matrix will return the original matrix after multiplication, the identity texture will return an original image at a certain resolution after applying it like a texture map. Additionally, the identity texture encodes positions in the original image as specific red-green-blue (RGB) colors, which represent universal coordinates (0 to 1, 0 to 1), and target locations for the specific pixel positions for the encoded universal coordinates to align.

The client device 205 may generate (230) a texture map. According to embodiments, the client device 205 may generate the texture map by modifying the identity texture based at least in part on the digital model for the item selected in (226). In particular, the client device 205 may "re-shape" the identity texture so that it conforms to the digital model, or to a portion of the digital model. For example, if the digital model is of a face mask, the client device 205 may modify the identity texture so that it conforms to the covering or mask portion of the face mask, resulting in the texture map. As a result, the texture map may represent a mapping between the coordinate space (i.e., the universal coordinates of the identity texture) to a pixel space.

The client device 205 may apply (232) the texture map to the digital image associated with the design selected in (226). As a result, the appropriate source pixels of the texture map are positioned to the digital image. In applying the texture map to the digital image, the client device 205 may encode visual content of the digital image by applying the texture map to the digital image.

The client device 205 may modify (234) the digital image using the visual content that was encoded. In effect, the visual content of the digital image may be "re-shaped" to fit the corresponding positions or locations of the texture map, and thus the digital image may have the same or similar form as the texture map. For example, if the texture map corresponds to a covering or mask portion of a face mask, the modified digital image may take the shape or form of the covering or mask portion.

The client device 205 may generate (236) a rendering of the item based on the modified digital image and the digital model of the item. In particular, the client device 205 may overlay or otherwise apply the modified digital image to the corresponding portion of the digital model. For example, if the modified digital image is in the form of the covering or mask portion of a face mask, the client device 205 may apply the modified digital image to the covering or mask portion of the corresponding digital model. Additionally, the client device 205 may account for any additional, unchanged portions of the digital model. For example, for a face mask, the generated rendering may include the straps of the face mask, which may not incorporate any portions of the modified digital image.

The client device 205 may display (238) the rendering of the item via the user interface. As a result, the user of the client device 205 may review the displayed rendering, may adjust or manipulate (i.e., view different sizes and views) the displayed rendering, such as in contemplation of further modifying, incorporating a different design, or placing an order for the physical item.

The client device 205 may facilitate (240) an order for the item with the server 210. In particular, the client device 205 may receive, via the user interface, a selection to place the order as well as details for the order (e.g., shipping and payment information, quantity, etc.), and the server 210 may process the order and facilitation fulfillment of the order.

FIGS. 3A-3F illustrate an example item and/or components or objects that an electronic device may use to digitally render the example item. The example item of FIGS. 3A-3F is a face mask, however it should be appreciated that alternative items are envisioned.

Figure 3A:
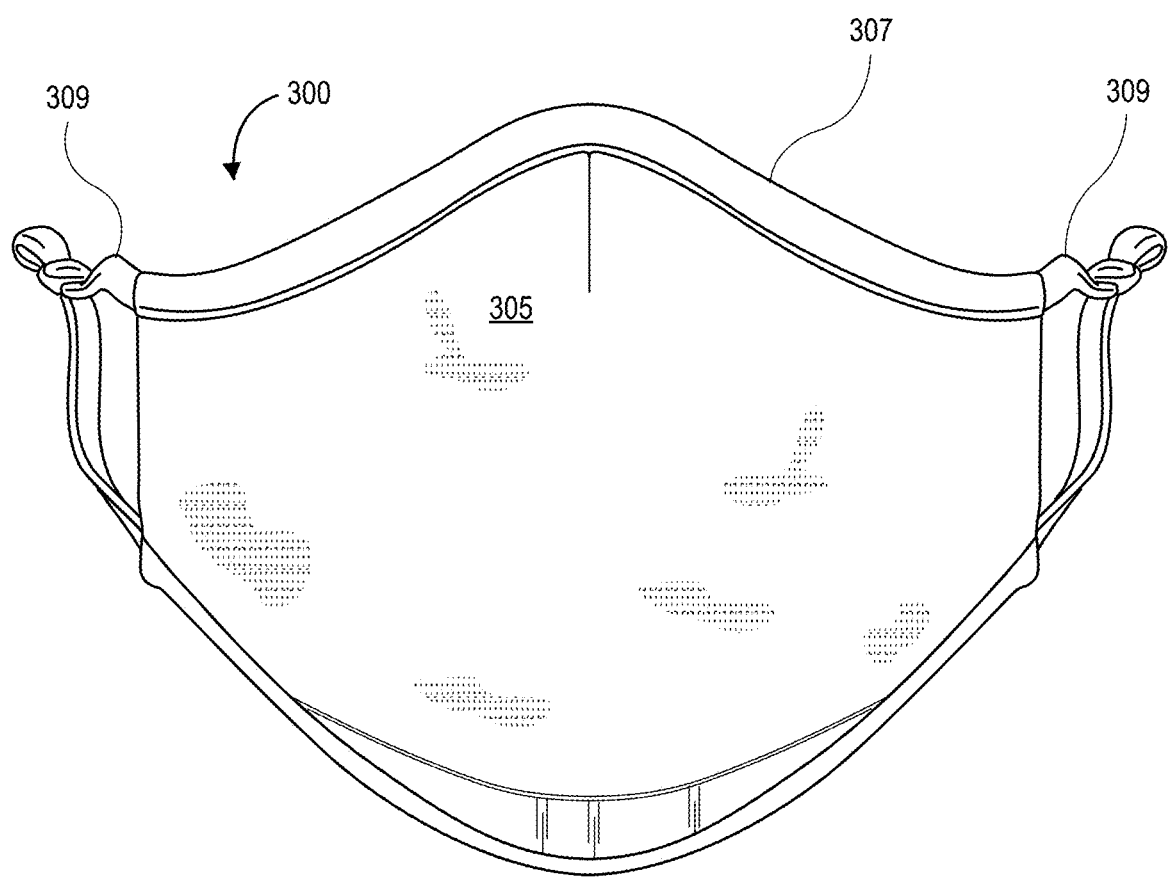
FIGS. 3A-3F illustrate various example renderings of an item and a digital design associated therewith, in accordance with some embodiments.

FIG. 3A illustrates an example face mask 300, where the face mask 300 may be composed of different parts or portions. In particular, the face mask 300 may comprise a covering or mask portion 305, a piping 307, and a set of ear straps 309, among other parts or components. According to embodiments, the face mask 300 may be embodied as a 3D model or other type of digital rendering.

Figure 3B:
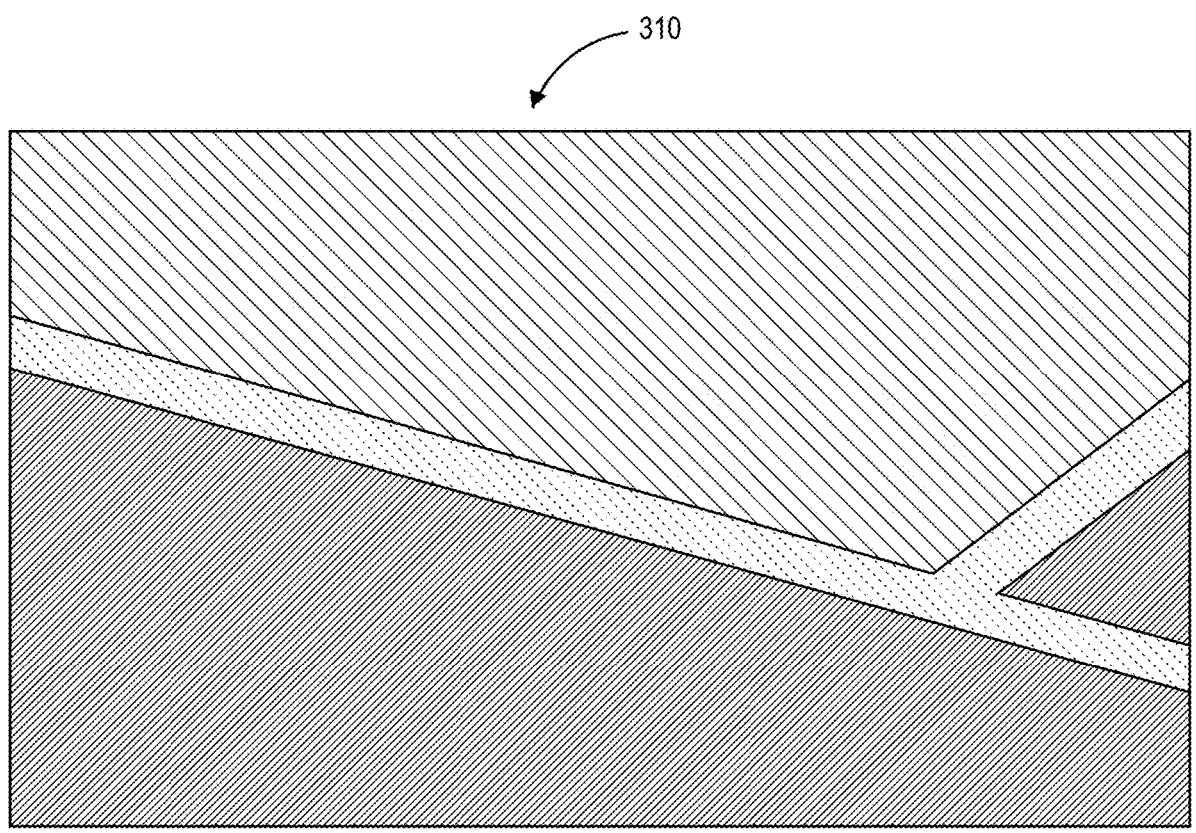

FIG. 3B illustrates a design 310 which may be embodied as a digital image or other type of multimedia. According to embodiments, a user of a design platform may desire to review a rendering of and/or place an order for the face mask 300 of FIG. 3A with the design 310 applied to the covering portion 305 of the face mask 300. As illustrated in FIGS. 3A and 3B, the shape of the design 310 as-is does not easily conform to align with the shape of the covering portion 305 of the face mask 300. Therefore, the design platform may analyze and modify the design 310 according to the techniques as described herein.

Figure 3C:
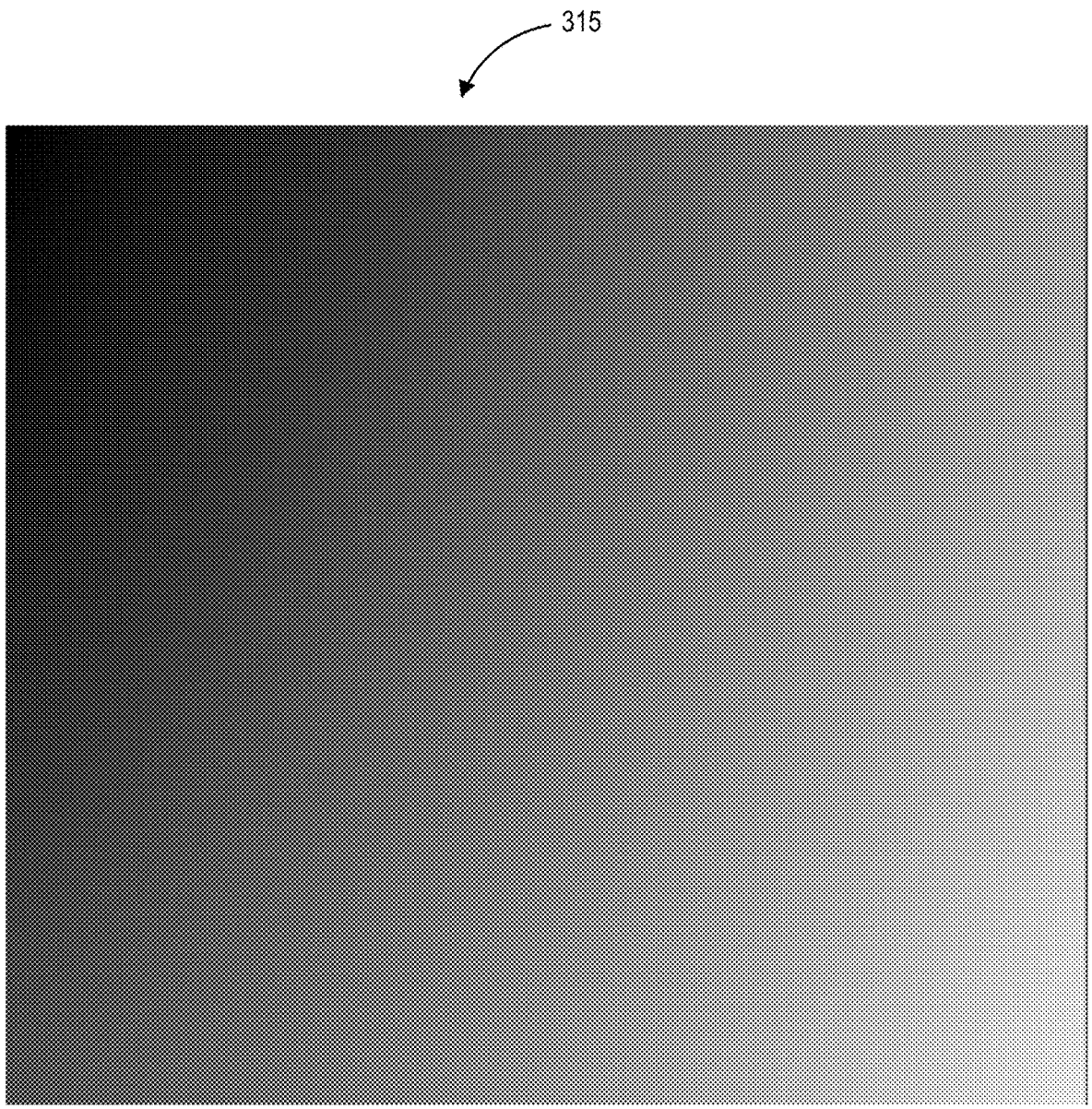
Figure 3D:
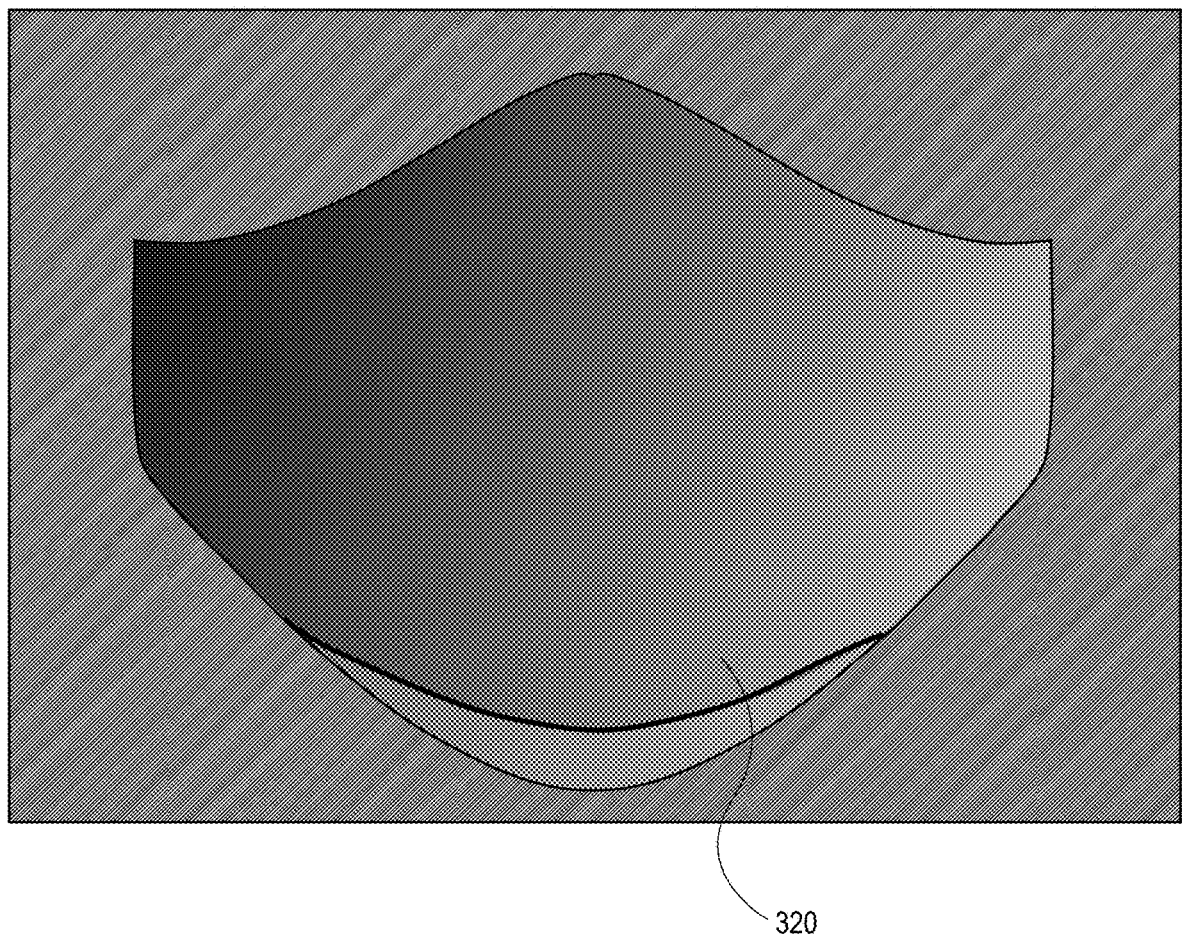

FIG. 3C illustrates an identity texture 315 that the design platform may use to analyze and modify the design 310. FIG. 3D illustrates a texture map 320 corresponding to the identity texture 315. According to embodiments, the design platform may generate the texture map 310 by modifying the identity texture 315 based on the shape of the covering portion 310 of the face mask 300 (i.e., based on the portion of the 3D model that corresponds to the covering portion 310). Although the identity texture 315 and the texture map 320 are illustrated in greyscale, it should be appreciated that a given identity texture and/or a given texture map may be in greyscale or in color gradient (e.g., a RGB color gradient), and may have various bit depths.

Figure 3E:
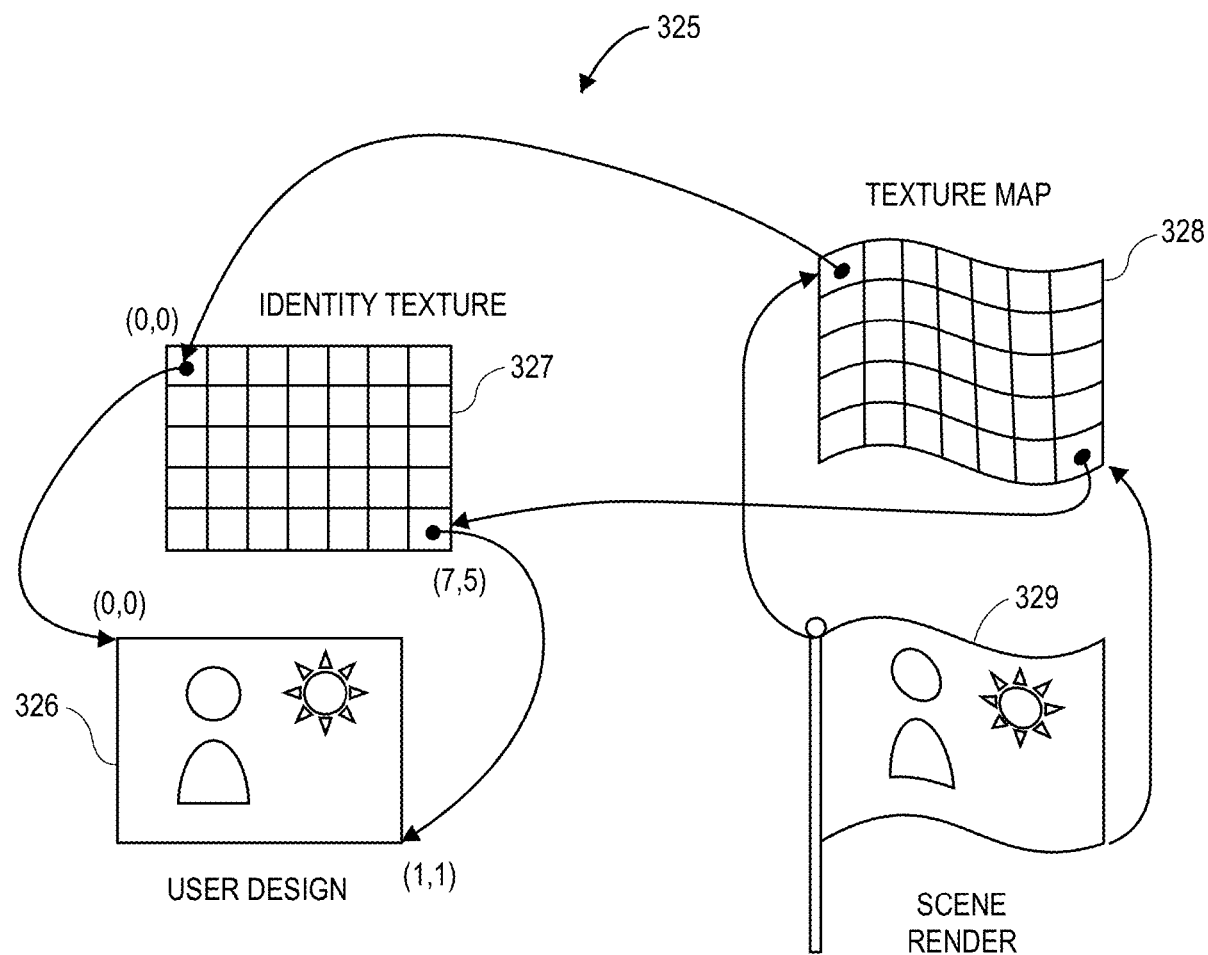

FIG. 3E illustrates a visual 325 associated with functionalities for generating a visual rendering of an item using an identity texture and a texture map. According to the example of FIG. 3E, the item may be a flag and a digital model of the flag may be the flag "flying" on a flagpole. As illustrated in FIG. 3E, a user design 326 depicts a person and a sun, and an identity texture 327 representing the user design 326 using universal coordinates.

The design platform may generate a texture map 328 by modifying the identity texture 327 based on the model of the flag. In particular, the design platform may generate the texture map 328 to take the form and/or shape of the "flying" flag. The design platform may modify the user design 326 by applying the texture map 328 to the user design 326. Accordingly, the modified user design may also take the form and/or shape of the flying flag.

The design platform may generate a rendering 329 of the flag based on the modified user design as well as the digital model of the flag. Thus, the rendering 329 may be depict the flying flag having the user design 326 incorporated therein, along with one or more additional components of the digital model (e.g., the flagpole).

Figure 3F:
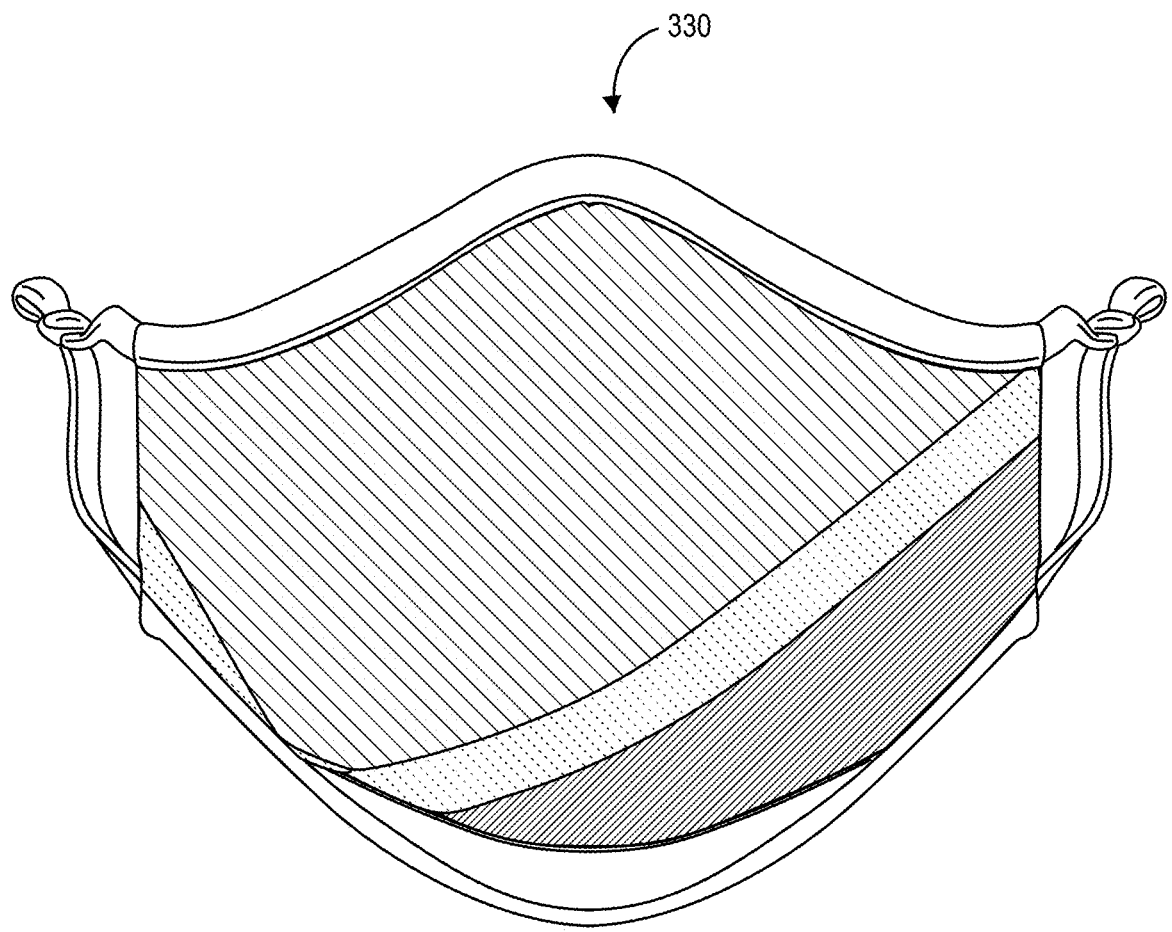

FIG. 3F depicts a face mask 330 with the design 310 incorporated as the covering portion of the face mask 330. The design platform may initially modify the design 310 by applying the texture map 320 to the design 310, and may generate the face mask 330 using the modified design 310 applied to the covering portion 305 as discussed with respect to FIG. 3B. The design platform may display the face mask 330 via a user interface, for review by the user.

Figure 4:
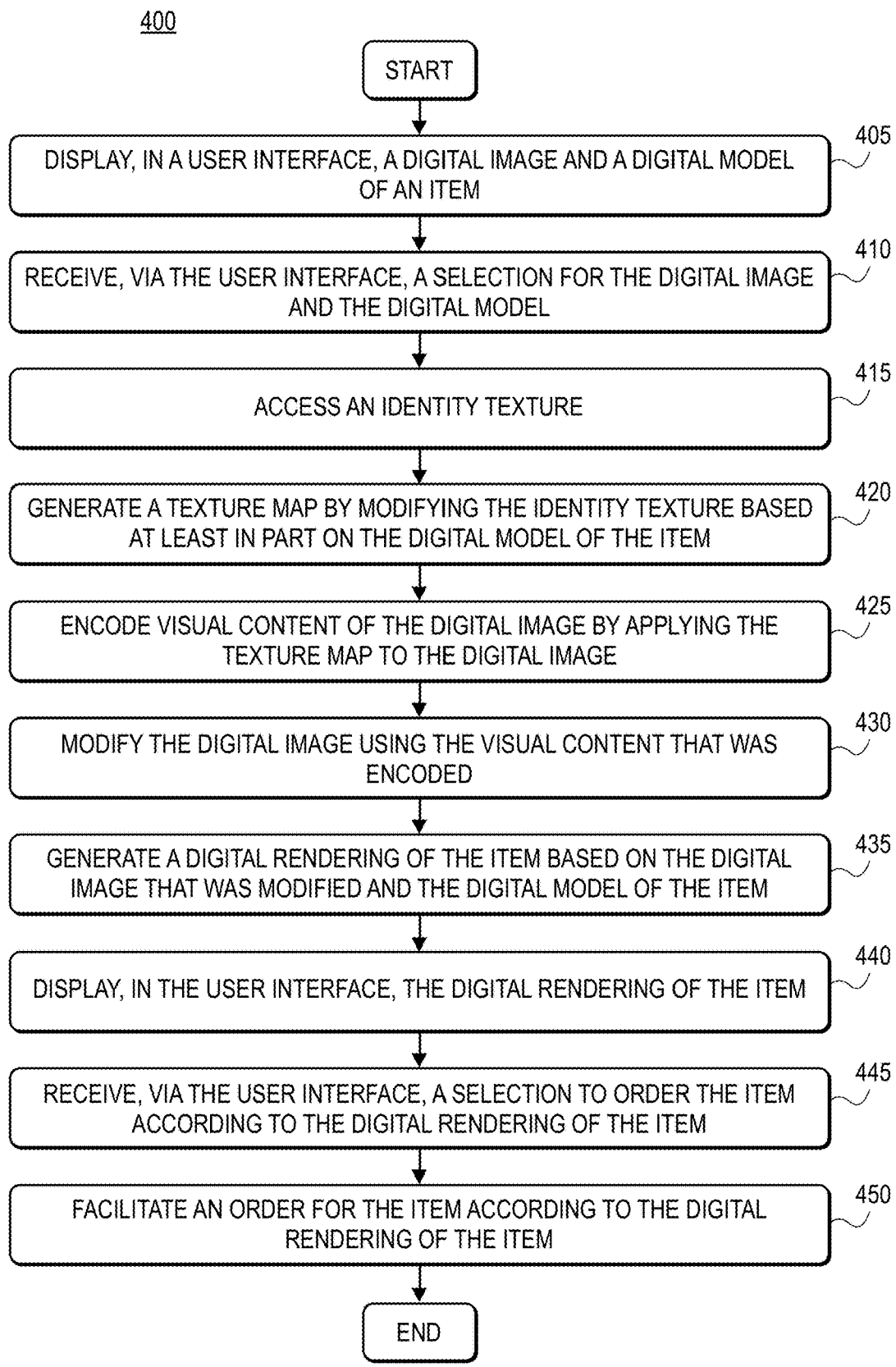
FIG. 4 depicts an example flow diagram associated with digitally rendering items, in accordance with some embodiments

FIG. 4 depicts is a block diagram of an example method 400 of digitally rendering items. The method 400 may be facilitated by an electronic device (such as any of the devices 103, 104, 105 as depicted in FIG. 1A) that may be in communication with a server(s) (such as the central server 110 as discussed with respect to FIG. 1A). In embodiments, the method 300 may be at least partially facilitated by a remote server, such as the central server 110 as discussed with respect to FIG. 1A. Further, the electronic device may operate or interface with a virtual design platform, such as via a website, application, or the like.

The method 400 may begin when the electronic device displays (block 405), in a user interface, a digital image and a digital model of an item. In embodiments, the electronic device may display a plurality of digital images and digital models for items, and enable a user to browse the various digital images and digital models. Further, the digital image may represent a design that the user may want to apply to the digital model.

The electronic device may receive (block 410), via the user interface, a selection for the digital image and the digital model of the item. Thus, the user may desire to review and/or order the item with the digital image (i.e., design) applied thereto. The electronic device may access (block 415) an identity texture that the electronic device may use to analyze and modify the digital image.

The electronic device may generate (block 420) a texture map by modifying the identity texture based at least in part on the digital model of the item. According to embodiments, the electronic device may identify a portion of the digital model of the item on which to apply the digital image (e.g., a covering for a face mask), conform the identity texture to a shape of the portion of the digital model, and generate the texture map based on the identity texture that was conformed to the shape of the portion of the digital model.

The electronic device may encode (block 425) visual content of the digital image by applying the texture map to the digital image. Thus, the electronic device may align the pixels of the digital image to their corresponding locations or positions of the texture map. The electronic device may modify (block 430) the digital image using the visual content that was encoded. Thus, the modified digital image may take the shape and/or general dimensions of the texture map.

The electronic device may generate (block 435) a digital rendering of the item based on the digital image that was modified and the digital model of the item. In embodiments, the electronic device may apply the digital image that was modified to the portion of the digital model of the item (e.g., the covering for a face mask), and render a remaining portion (e.g., any piping or straps for the face mask) of the digital model of the item. The electronic device may display (block 440), in the user interface, the digital rendering of the item.

The user of the electronic device may review the displayed digital rendering and the electronic device may receive (block 445), via the user interface, a selection to order the item according to the digital rendering of the item. The electronic device may facilitate (block 450) an order for the item according to the digital rendering of the item.

Figure 5:
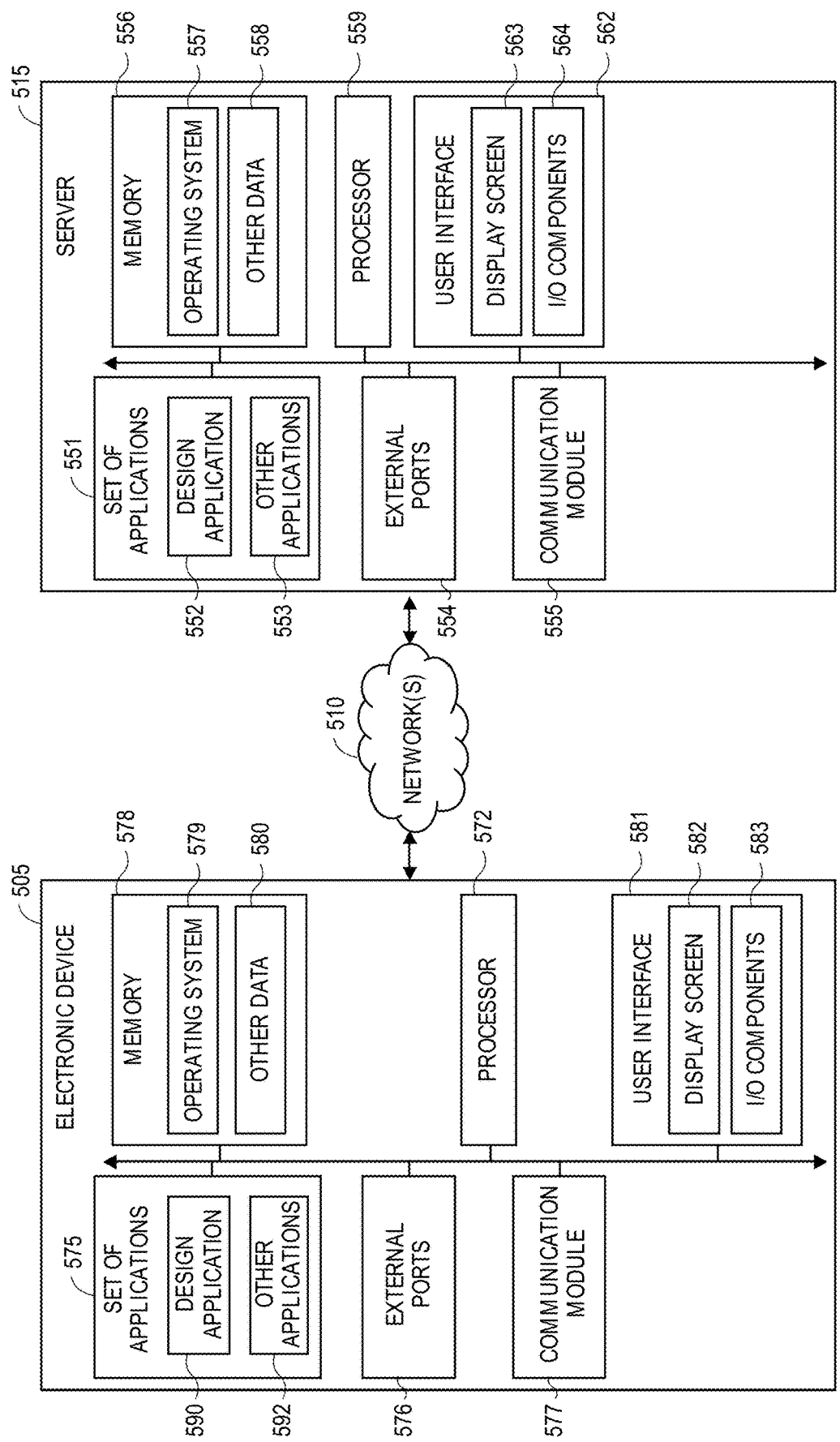
FIG. 5 is a block diagram of an example electronic device and an example server, in accordance with some embodiments.

FIG. 5 illustrates a hardware diagram of an example electronic device 505 (such as one of the electronic devices 103, 104, 105 as discussed with respect to FIG. 1A) and an example server 515 (such as the server computer 110 as discussed with respect to FIG. 1A), in which the functionalities as discussed herein may be implemented.

The electronic device 505 may include a processor 572 as well as a memory 578. The memory 578 may store an operating system 579 capable of facilitating the functionalities as discussed herein as well as a set of applications 575 (i.e., machine readable instructions). For example, one of the set of applications 575 may be a design application 590 configured to facilitate functionalities associated with creating and editing digital designs in various formats, as discussed herein. It should be appreciated that one or more other applications 592 are envisioned.

The processor 572 may interface with the memory 578 to execute the operating system 579 and the set of applications 575. According to some embodiments, the memory 578 may also include other data 580 including formatting data. The memory 578 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The electronic device 505 may further include a communication module 577 configured to communicate data via one or more networks 510. According to some embodiments, the communication module 577 may include one or more transceivers (e.g., WWAN, WLAN, and/or WPAN transceivers) functioning in accordance with IEEE standards, 3GPP standards, or other standards, and configured to receive and transmit data via one or more external ports 576. For example, the communication module 577 may communicate with the server 515 via the network(s) 510.

The electronic device 505 may further include a user interface 581 configured to present information to a user and/or receive inputs from the user. As shown in FIG. 5, the user interface 581 may include a display screen 582 and I/O components 583 (e.g., ports, capacitive or resistive touch sensitive input panels, keys, buttons, lights, LEDs). According to some embodiments, the user may access the electronic device 505 via the user interface 581 to review various designs and renderings, and make various selections.

In some embodiments, the electronic device 505 may perform the functionalities as discussed herein as part of a "cloud" network or may otherwise communicate with other hardware or software components within the cloud to send, retrieve, or otherwise analyze data.

As illustrated in FIG. 5, the electronic device 505 may communicate and interface with the server 515 via the network(s) 510. The server 515 may include a processor 559 as well as a memory 556. The memory 556 may store an operating system 557 capable of facilitating the functionalities as discussed herein as well as a set of applications 551 (i.e., machine readable instructions). For example, one of the set of applications 551 may be a design application 552 configured to facilitate functionalities associated with creating and editing digital designs in various formats, as discussed herein. It should be appreciated that one or more other applications 553 are envisioned.

The processor 559 may interface with the memory 556 to execute the operating system 557 and the set of applications 551. According to some embodiments, the memory 556 may also include other data 558, such data received from the electronic device 505 and/or other data. The memory 556 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The server 515 may further include a communication module 555 configured to communicate data via the one or more networks 510. According to some embodiments, the communication module 555 may include one or more transceivers (e.g., WWAN, WLAN, and/or WPAN transceivers) functioning in accordance with IEEE standards, 3GPP standards, or other standards, and configured to receive and transmit data via one or more external ports 554.

The server 515 may further include a user interface 562 configured to present information to a user and/or receive inputs from the user. As shown in FIG. 5, the user interface 562 may include a display screen 563 and I/O components 564 (e.g., ports, capacitive or resistive touch sensitive input panels, keys, buttons, lights, LEDs). According to some embodiments, the user may access the server 515 via the user interface 562 to review information, make selections, and/or perform other functions.

In some embodiments, the server 515 may perform the functionalities as discussed herein as part of a "cloud" network or may otherwise communicate with other hardware or software components within the cloud to send, retrieve, or otherwise analyze data.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code may be adapted to be executed by the processors 572, 559 (e.g., working in connection with the respective operating systems 579, 557) to facilitate the functions as described herein. In this regard, the program code may be implemented in any desired language, and may be implemented as machine code, assembly code, byte code, interpretable source code or the like (e.g., via Golang, Python, Scala, C, C++, Java, Actionscript, Objective-C, Javascript, CSS, XML). In some embodiments, the computer program product may be part of a cloud network of resources.

Although the following text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical.

What is claimed is:

1. A computer-implemented method of digitally rendering items, the computer-implemented method comprising:

accessing, by a processor, a digital image and an identity texture, wherein the identity texture encodes (i) a set of positions in the digital image as specific red-green-blue (RGB) colors representing a set of universal coordinates, and (ii) a set of target locations for the encoded set of positions representing the set of universal coordinates to align;

generating, by the processor, a texture map by modifying the identity texture based at least in part on a digital model of an item so that the texture map represents a mapping between the set of universal coordinates and a pixel space, wherein the modifying conforms the identity texture to a shape of a portion of the digital model of the item;

encoding, by the processor, visual content of the digital image by applying the texture map to the digital image;

modifying, by the processor, the digital image using the visual content that was encoded;

generating, by the processor, a digital rendering of the item based on (i) the digital image that was modified, and (ii) the digital model of the item; and displaying, in a user interface, the digital rendering of the item.

2. The computer-implemented method of claim 1, wherein the digital image and the identity texture have the same aspect ratio.

3. The computer-implemented method of claim 1, wherein the digital model of the item is a 3D model of the item.

4. The computer-implemented method of claim 1, wherein accessing the digital image and the identity texture comprises:

displaying, in the user interface, the digital image and the digital model of the item;

receiving, via the user interface, a set of selections for the digital image and the digital model of the item; and in response to receiving the set of selections, accessing the identity texture.

5. The computer-implemented method of claim 1, wherein generating the texture map comprises:

identifying, by the processor, a portion of the digital model of the item on which to apply the digital image;

conforming, by the processor, the identity texture to a shape of the portion of the digital model; and generating, by the processor, the texture map based on the identity texture that was conformed to the shape of the portion of the digital model.

6. The computer-implemented method of claim 5, wherein generating the digital rendering of the item comprises:

applying the digital image that was modified to the portion of the digital model of the item; and rendering a remaining portion of the digital model of the item.

7. The computer-implemented method of claim 1, further comprising:

receiving, via the user interface, a selection to order the item according to the digital rendering of the order; and facilitating the order for the item according to the digital rendering of the item.

8. A system for digitally rendering items, comprising:

a user interface;

a memory storing a set of computer-readable instructions; and a processor interfacing with the user interface and the memory, and configured to execute the set of computer-readable instructions to cause the processor to:

access a digital image and an identity texture, wherein the identity texture encodes (i) a set of positions in the digital image as specific red-green-blue (RGB) colors representing a set of universal coordinates, and (ii) a set of target locations for the encoded set of positions representing the set of universal coordinates to align, generate a texture map by modifying the identity texture based at least in part on a digital model of an item so that the texture map represents a mapping between the set of universal coordinates and a pixel space, wherein the modifying conforms the identity texture to a shape of a portion of the digital model of the item, encode visual content of the digital image by applying the texture map to the digital image, modify the digital image using the visual content that was encoded, generate a digital rendering of the item based on (i) the digital image that was modified, and (ii) the digital model of the item, and cause the user interface to display the digital rendering of the item.

9. The system of claim 8, wherein the digital image and the identity texture have the same aspect ratio.

10. The system of claim 8, wherein the digital model of the item is a 3D model of the item.

11. The system of claim 8, wherein to access the digital image and the identity texture, the processor is configured to:

cause the user interface to display the digital image and the digital model of the item, receive, via the user interface, a set of selections for the digital image and the digital model of the item, and in response to receiving the set of selections, access the identity texture.

12. The system of claim 8, wherein to generate the texture map, the processor is configured to:

identify a portion of the digital model of the item on which to apply the digital image, conform the identity texture to a shape of the portion of the digital model, and generate the texture map based on the identity texture that was conformed to the shape of the portion of the digital model.

13. The system of claim 12, wherein to generate the digital rendering of the item, the processor is configured to:

apply the digital image that was modified to the portion of the digital model of the item, and render a remaining portion of the digital model of the item.

14. The system of claim 8, wherein the processor is further configured to:

receive, via the user interface, a selection to order the item according to the digital rendering of the order, and facilitate the order for the item according to the digital rendering of the item.

15. A non-transitory computer-readable storage medium having stored thereon a set of instructions, executable by at least one processor, for digitally rendering items, the instructions comprising:

instructions for accessing a digital image and an identity texture, wherein the identity texture encodes (i) a set of positions in the digital image as specific red-green-blue (RGB) colors representing a set of universal coordinates, and (ii) a set of target locations for the encoded set of positions representing the set of universal coordinates to align;

instructions for generating a texture map by modifying the identity texture based at least in part on a digital model of an item so that the texture map represents a mapping between the set of universal coordinates and a pixel space, wherein the modifying conforms the identity texture to a shape of a portion of the digital model of the item;

instructions for encoding visual content of the digital image by applying the texture map to the digital image;

instructions for modifying the digital image using the visual content that was encoded;

instructions for generating a digital rendering of the item based on (i) the digital image that was modified, and (ii) the digital model of the item; and instructions for displaying, in a user interface, the digital rendering of the item.

16. The non-transitory computer-readable storage medium of claim 15, wherein the digital image and the identity texture have the same aspect ratio.

17. The non-transitory computer-readable storage medium of claim 15, wherein the digital model of the item is a 3D model of the item.

18. The non-transitory computer-readable storage medium of claim 15, wherein the instructions for accessing the digital image and the identity texture comprise:
　instructions for displaying, in the user interface, the digital image and the digital model of the item;
　instructions for receiving, via the user interface, a set of selections for the digital image and the digital model of the item; and
　instructions for, in response to receiving the set of selections, accessing the identity texture.

19. The non-transitory computer-readable storage medium of claim 15, wherein the instructions for generating the texture map comprise:
　instructions for identifying a portion of the digital model of the item on which to apply the digital image;
　instructions for conforming the identity texture to a shape of the portion of the digital model; and
　instructions for generating the texture map based on the identity texture that was conformed to the shape of the portion of the digital model.

20. The non-transitory computer-readable storage medium of claim 19, wherein the instructions for generating the digital rendering of the item comprise:
　instructions for applying the digital image that was modified to the portion of the digital model of the item; and
　instructions for rendering a remaining portion of the digital model of the item.

\* \* \* \* \*